United States Patent [19]

Bergman, Jr. et al.

[11] Patent Number: 5,200,080
[45] Date of Patent: Apr. 6, 1993

[54] WASTE TREATMENT OXIDATION OPERATIONS

[75] Inventors: Thomas J. Bergman, Jr., North Tarrytown; Lawrence M. Litz, Pleasantville, both of N.Y.

[73] Assignee: Praxair Technology, Inc., Danbury, Conn.

[21] Appl. No.: 769,645

[22] Filed: Oct. 2, 1991

[51] Int. Cl.⁵ .............................................. C02F 3/00
[52] U.S. Cl. ................................. 210/607; 210/626; 210/627; 210/195.1; 210/199; 210/253
[58] Field of Search ............... 210/607, 626, 627, 629, 210/247, 195.1, 199, 253

[56] References Cited

U.S. PATENT DOCUMENTS

| | | | |
|---|---|---|---|
| 4,085,041 | 4/1978 | Fullerton et al. | 210/626 X |
| 4,226,717 | 10/1980 | Malm | 210/195.1 |
| 4,457,844 | 7/1984 | Beard | 210/626 X |
| 4,544,207 | 10/1985 | Litz | 299/5 |

*Primary Examiner*—Charles Hart
*Attorney, Agent, or Firm*—Alvin H. Fritschler

[57] ABSTRACT

Bioremediation or other liquid waste biotreatment operations are enhanced by the use of turbulence promoters to create turbulent flow conditions in an oxygen/liquid waste dispersion prior to passage in an improved gas/liquid distribution system for passage through eductors into a lagoon or other holding source of the liquid waste being treated.

34 Claims, 1 Drawing Sheet

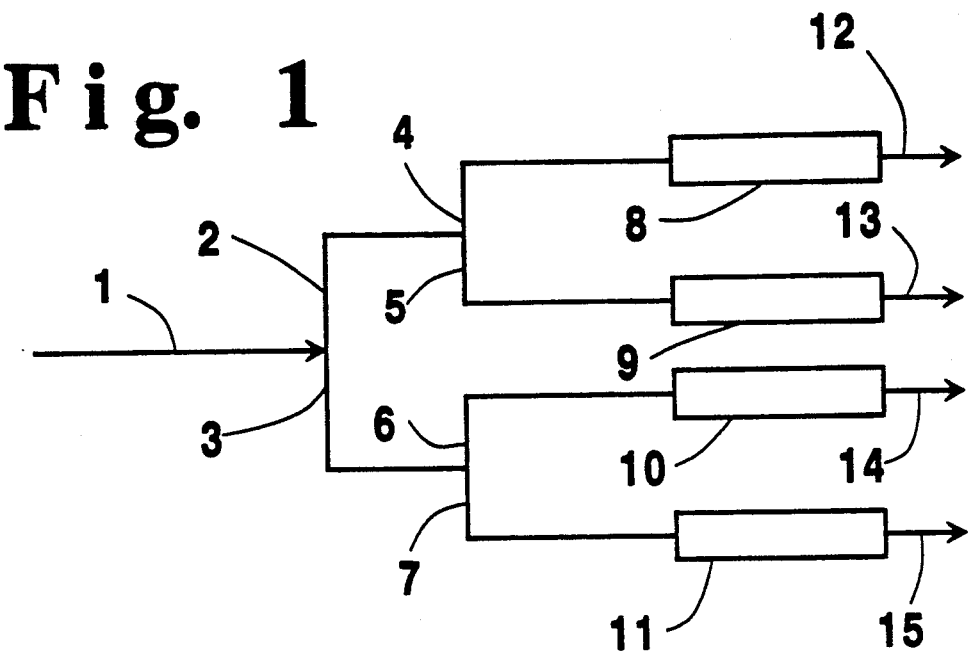
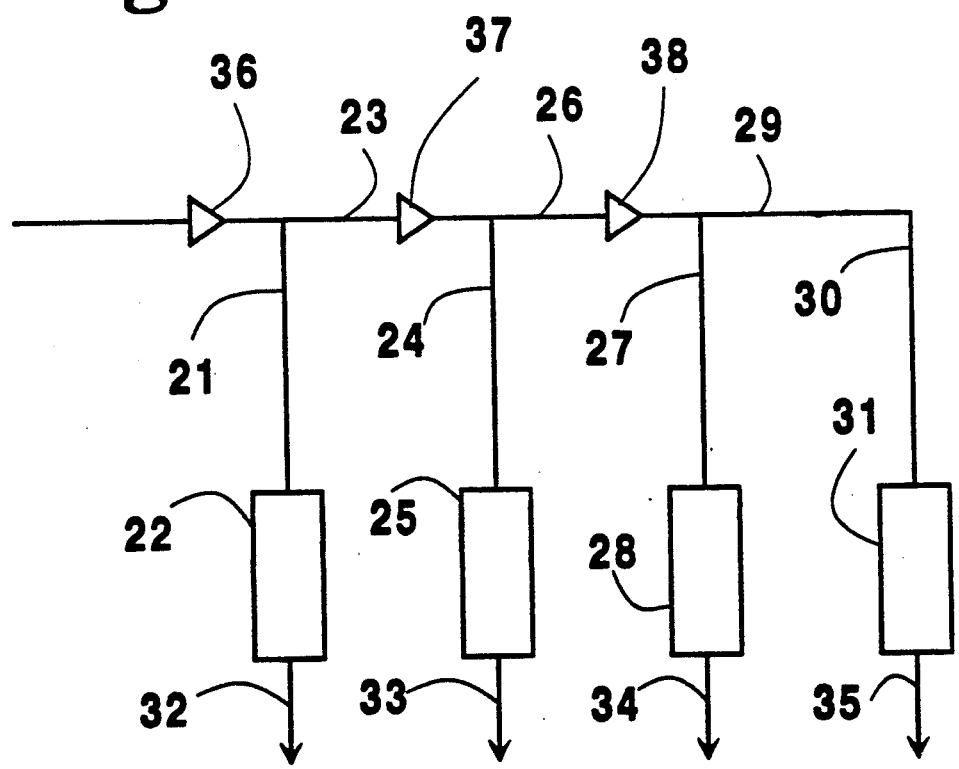

WASTE TREATMENT OXIDATION OPERATIONS

BACKGROUND OF THE INVENTION

1. Field of the Invention

The invention relates to liquid waste treatment operations. In particular, it relates to improved liquid waste treatment oxidation operations.

2. Description of the Prior Art

Biotreatment of industrial and municipal wastewater is commonly practiced in the art. By this approach, continuously fed, toxic chemicals, which are typically dissolved in water, are consumed by living, typically aerobic organisms, and are converted into environmentally safe substances. Similarly, the term "bioremediation" is used to refer to the destruction of toxic chemicals that are both soluble and insoluble in water. Insoluble materials are typically stirred into suspension, from either the bottom or top of a body of water, to make them accessible to such organisms.

For aerobic biotreatment processes to succeed, sufficient oxygen must be available to the organisms for them to survive and multiply. For this purpose, oxygen may be supplied to the liquid waste at a variety of purity levels, ranging from air to pure oxygen. If oxygen or air enrichment are used, most of the injected oxygen must dissolve for the process to be economically feasible, since the cost of oxygen is typically higher than any other element of operating cost.

In response to the need for improved oxygen dissolution technology for liquid waste treatment, a so-called MIXFLO® system has been developed by Societa Italiana Acetilene & Derivati (SIAD) for use in both closed and open tanks, as well as in lagoons. In the MIXFLO® system, oxygen is dissolved in a two stage process. In the first stage, liquid waste is pumped from a lagoon or holding tank and is pressurized to between 2 and 4 atm. Pure oxygen is then dispersed in the liquid, and the resulting two-phase mixture is passed through a pipeline contactor in which typically about 60% of the injected oxygen dissolves. At an elevated operating pressure, the solubility of oxygen in liquid, e.g. water, increases substantially. Therefore, the rate at which oxygen dissolves is increased, and the contactor length necessary to dissolve the oxygen is minimized. The amount of water pumped also decreases, as the pressure increases, because a given water volume has a greater dissolved oxygen capacity at elevated pressures.

In the second stage, the oxygen/water dispersion is re-injected into the lagoon or holding tank using a conventional liquid/liquid eductor which (1) dissipates the pumping energy into the oxygen/water mixture, forming a fine bubble dispersion, and (2) ingests unoxygenated water, mixes it with the oxygenated water, and then discharges the resulting mixture into a lagoon or holding tank. For this purpose, a typical ratio of unoxygenated water to oxygenated water employed is 3:1.

Diluting oxygenated water with unoxygenated water within the eductor has two advantages. First, the dissolved oxygen level obtained in the pipeline contactor is significantly greater than the saturation oxygen concentration at atmospheric pressure. When the oxygenated water is diluted, the dissolved oxygen level decreases to below atmospheric pressure saturation. Therefore, oxygen that is dissolved within the pipeline contactor does not come out of solution upon being discharged into the lagoon or holding tank. Secondly, oxygen not dissolved in the pipeline contactor is well distributed by the large volume of water passing through the eductor. As a result, the frequency of undesired bubble coalescence downstream of the eductor is low.

Typically, 75% of the oxygen that is not dissolved within the pipeline contactor dissolves within the lagoon or holding tank because of the enhanced dispersion action of the eductors. The first and second stages of the MIXFLO® system, therefore, together result in the dissolution of 90% of the injected oxygen.

The application of the MIXFLO® system has been extended to bioremediation processes carried out at Superfund and Resource Conservation and Recovery Act (RCRA) waste sites. Such activities differ from the liquid waste biotreatment referred to above in several respects as discussed below.

Bioremediation is often carried out in a batch lagoon, with nothing being added to, or subtracted from, the lagoon until the entire body of water is cleaned, and the insoluble toxic chemicals present therein are destroyed. As contaminants are destroyed, the contents of the body of water changes, so that the mass transfer characteristics of the lagoon contents vary significantly with time.

The solids level encountered in bioremediation processes is usually much higher than in liquid waste treatment processes because the soil at the base of the lagoon is generally contaminated with organics and is treated simultaneously with the liquid portion of the lagoon.

The contaminants are often highly toxic in bioremediation processes, and, at high concentration levels, such as those contained in the soil, such contaminants can become toxic to the organisms used in the treatment process. Therefore, the solids suspension levels applicable in bioremediation processes must be carefully controlled.

The liquid encountered in such bioremediation processing often is found to contain oily substances that are not soluble in water. Such oils must be precluded from entering the oxygen supply piping.

While the MIXFLO® system is a highly desirable approach for carrying out bioremediation activities, it is appreciated that further improvements in the art are needed in response to the various factors and needs specific to bioremediation as outlined above. Some of such needs will be understood to pertain also with respect to wastewater biotreatment processing.

It is an object of the invention, therefore, to provide an improved system for bioremediation processing.

It is another object of the invention to provide a treatment system response to specific needs of bioremediation operations.

With these and other objects in mind, the invention is hereinafter described in detail, the novel features thereof being particularly pointed out in the appended claims.

SUMMARY OF THE INVENTION

Pipe reducers are provided to create a smooth transition from normal non- and low turbulent flow to high turbulent flow in a pipeline contactor at positions before each branch point therein for the essentially uniform passage of oxygenated water to multiple liquid/liquid eductors. Fine gas dispersions in liquid are achieved thereby in bioremediation and in biotreatment operations with minimal erosion of the pipeline contactor and branch lines.

BRIEF DESCRIPTION OF THE DRAWINGS

The invention is further described with reference to the accompanying drawings in which:

FIG. 1 is a process flow diagram of a conventional MIXFLO ® distribution system for the passage of gas/liquid dispersions to eductors for discharge into a lagoon; and FIG. 2 is a process flow diagram of a distribution system of the invention for the essentially uniform passage of gas/liquid dispersions to eductors for discharge into a lagoon.

DETAILED DESCRIPTION OF THE INVENTION

The objects of the invention are accomplished by an improved distribution system and process satisfying various needs encountered in bioremediation operations. Some of these needs are also observed in liquid waste biotreatment operations. The invention can be applied, therefore, to any waste treatment oxidation operation.

In the Litz U.S. Pat. No. 4,544,207, a method is disclosed for the uniform distribution of gas and liquid to branched piping systems. Various devices, such as orifices, venturis, pipe restrictions and the like, are installed before each branch to create sufficient turbulence to obtain good mixing of the gas and liquid prior to splitting the stream at the branch.

Because lagoons generally have a high solids content, e.g. typically greater than 5%, which can erode any obstruction, orifice plates and the like are not a practical means for creating the desired turbulence in bioremediation operations. For purposes of the invention, however, it is found that pipe reducers are a highly effective and desirable means for creating the high turbulence necessary for good gas/liquid mixing prior to the passage thereof to eductors from which an enhanced gas/liquid dispersion is injected into a lagoon or other such body of water being treated by bioremediation or other liquid waste treatment oxidation process.

The pipe reducers referred to above are incorporated into a modification of the MIXFLO ® system as heretofore practiced. It should be noted that, in all MIXFLO ® systems, more than one eductor is placed at the discharge thereof to distribute oxygenated liquid, and any undissolved oxygen, as uniformly as possible within the lagoon or reaction tank employed for the waste treatment oxidation operation. In conventional MIXFLO ® systems, the piping that distributes the oxygen/slurry dispersion to the eductors is installed in a symmetrical configuration to assure that the pressure loss in each eductor is the same, thereby facilitating uniform gas/liquid distribution.

An illustrative example of conventional MIXFLO ® system processing as shown in FIG. 1 of the drawings. An influent water slurry is pumped through line 1, representing a pipeline contactor for the dissolution of injected oxygen, to a branch point at which the flow is divided so as to pass through branch lines 2 and 3. In order to accommodate the four-eductor arrangement illustrated, each such branch line passes to a further branch point at which the flow therein is divided so as to pass through further branch lines. Thus, branch line 2 is symmetrically divided into further branch lines 4 and 5, and branch line 3 is similarly divided into further branch lines 6 and 7 so as to facilitate uniform gas/liquid distribution. Said further branch lines 4, 5, 6 and 7 pass to eductors 8, 9, 10 and 11, respectively. From each eductor, the oxygen/water dispersion is re-injected into the lagoon, or tank, for the body of liquid being treated, as indicated by flow lines 12, 13, 14 and 15, respectively.

Those skilled in the art will appreciate that the MIXFLO ® distribution system as illustrated in FIG. 1 requires a great deal of space and an extensive support structure, because of the large number of bends and elbows required to accomplish the flow pattern employed therein. Also, as noted above, an even number of eductors must always be installed.

In lagoon applications, the eductors are often installed far from the shore line because most lagoons are shallow near their edge, and eductors desirably should be submerged at least 10 feet below the lagoon water surface. It is difficult, therefore, to install an elaborate support structure for the MIXFLO ® system. For example, lagoons are often surrounded by a flood wall, road, fence or other such restriction, which limits the available space along the shore for distribution system piping. In addition, although said distribution system requires that an even number of eductors be employed, it will be appreciated that the use of an odd number of eductors might otherwise be desirable, due to the limited number of eductor sizes commercially available and the production requirements of a given application.

The distribution system of the invention is shown in the illustrative embodiment of FIG. 2. As shown therein, an influent water slurry is passed through line 20, representing a pipeline contactor for the dissolution of injected oxygen, as in the FIG. 1 system. In the four-eductor arrangement illustrated in FIG. 2, line 20 extends to a first branch point from which branch line 21 extends to eductor 22. A portion of the oxygen/water dispersion passes through said branch line 21 to eductor 22, while the remaining portion thereof passes in line 23 to the second branch point, from which branch line 24 extends to eductor 25. A portion of the oxygen/water dispersion flowing through line 23 passes in branch line 24 to eductor 25, while the remaining portion passes in line 26 to the third branch point.

At said third branch point, branch line 27 extends to eductor 28. A portion of the remaining oxygen/water dispersion passes through line 27 to eductor 28, while the residual portion thereof passes in line 29 and through line 30 to eductor 31.

As in the FIG. 1 distribution system, an oxygen/water dispersion is discharged from eductors 22, 25, 28 and 31 in the FIG. 2 embodiment of the invention, as shown by flow lines 32, 33, 34 and 35, respectively, for re-injection into the lagoon, or tank, containing the body of liquid being treated. In the practice of the invention, conveniently carried out on a continuous basis, with liquid waste to be treated being continuously pumped from the lagoon and re-injected therein, fine oxygen/water dispersions are advantageously created for enhanced liquid waste oxidation treatment.

The desirable results of the invention are accomplished by the use of the advantageous MIXFLO ® distribution system modification as shown in FIG. 2, including the incorporation of a pipe reducer or other turbulence promoter means before each branch point in the distribution system. Thus, in the FIG. 2 embodiment, pipe reducer 36 is incorporated in line 20 before the first branch point. Similarly, pipe reducers 37 and 38 are incorporated in lines 23 and 26, respectively.

Each pipe reducer will be understood to comprise a region of reduced pipe, or line, diameter such as to create a smooth transition from the normal non- or low turbulent flow condition in the pipeline contactor to a high turbulent flow condition for enhanced dispersion of the injected oxygen into the liquid waste being treated. This enhanced dispersion facilitates the essentially uniform distribution of the gas/liquid mixture between the two legs of the branch. It will be recognized by those skilled in the art that other means of creating good gas dispersion by high turbulence in the branch may be incorporated in the system, e.g. by the use of orifice plates, verturi devices, and the like, as turbulence promoters at least about one pipe diameter upstream of the branch points. The series of pipeline reducers employed in the practice of the invention comprise reduced diameter lines such that the diameter of line 20 upstream of pipeline reducer 36 is greater than the diameter of line 23 upstream of the pipeline reducer 37. Likewise, the diameter of said line 23 is greater than that of line 26 upstream of pipeline reducer 38, and said diameter of line 26 is greater than that of line 29 from which line 30 extends.

For purposes of creating the desired high turbulent flow conditions prior to the diversion of a portion of the gas/water dispersion through each branch line, it has been found generally desirable to size the pipeline reducers so as to provide a flow velocity of at least about 7 feet/sec, and preferably about 10 feet/sec or more, in each line at a distance of at least about one pipe diameter before each branch point.

The process and system of the invention, employing an advantageous MIXFLO ® distribution system modification, together with the incorporation of turbulence promoter means, such as pipeline reducers as described above, has been found to be effective in creating a fine oxygen/water dispersion with little undesired erosion of the components of the system. In this regard, it should be noted that the number of elbows and tees, which are subject to erosion potential, particularly in bioremediation operations, is reduced in the piping arrangement of the invention as illustrated in FIG. 2 of the drawings.

Those skilled in the art will appreciate that various changes and modifications can be made in the details of the invention as described herein without departing from the scope of the invention as set forth in the appended claims. For example, in liquid waste treatment wherein solid loadings of less than 4% are typically encountered, it is desirable to use the momentum produced at the eductor discharge to lift solids off the lagoon or reactor floor. These solids often contain contaminants that must be consumed in the biotreatment process. A pumping power of 25 W/m$^3$, which is the minimum power required to suspend the solid particles, is typically employed, although greater amounts of power can also be employed.

In bioremediation operations, the solids level tends to be very high. If excess solids are suspended, however, the contaminant level in the slurry can become toxic to the organisms. Therefore, it is desirable to regulate solids suspension and oxygenation separately. For this purpose, the invention must operate at below the recommended power input level for solids-containing systems. For bioremediation operations, the pumping power input should be less than said 25 W/m$^3$ of liquid volume, but should be greater than 6 W/m$^3$. The power input for this application is preferably from about 8 to about 20 W/m$^3$, with the optimal power input being typically about 12 W/m$^3$.

It should also be appreciated that the invention is not limited to the necessity for employing an even number of eductors, as in the conventional MIXFLO ® distribution system. In the practice of the invention, two or more eductor units can be employed, with the total number of such eductor units being either an even or odd number of such eductor units. In the practice of the invention, the gas/liquid waste dispersion is divided so that each separate portion thereof, each containing essentially the same concentration of undissolved gas therein, is passed under high turbulent flow conditions to each educator unit.

While process gases are commonly injected into liquid streams in many processes, concerns of flammability and/or corrosion must be addressed when oxygen is being injected into a contaminant-containing liquid. During startups, shutdowns and/or other possible operating conditions, the liquid stream may be at pressure, while the oxygen stream is not at pressure. This condition can lead to the flow of liquid into the gas piping even if the piping is arranged so as to prevent this occurrence during normal operations. It is desirable, therefore to employ two valves in series in the gas pipeline.

In another embodiment of the invention, control interlocks can be employed to prevent liquid flow or pressurization of the liquid line unless the gas pressure upstream of the valve(s) is higher than the liquid pressure, thus preventing liquid from entering the gas supply line. The process gas, i.e., air, oxygen or oxygen-enriched air, or a blanketing or inerting gas, such as nitrogen, can be used for this purpose.

The process and system of the invention provides enhanced oxygen/water dispersions, simplified processing structure, enhanced operating flexibility, reduced eroding of equipment, reduced power consumption and enhanced prevention of potential ignition by means of the oxygen bubble trap feature. The invention thus facilitates the carrying out of bioremediation operations, while also being of advantageous use for other biotreatment of industrial and municipal liquid waste operations. The invention thus provides a highly desirable and practical advance in the liquid waste treatment field, particularly in response to the needs of the art with respect to bioremediation operations.

We claim:

1. An improved process for the oxidation of liquid waste comprising:
   (a) passing liquid waste from its holding source through a flow line;
   (b) dispersing an oxygen-containing gas into the liquid waste in said flow line, thereby forming a gas/liquid dispersion;
   (c) pumping the gas/liquid dispersion through a pipeline contactor zone at an elevated pressure under non- or low turbulent flow conditions for the dissolution of oxygen into said liquid waste;
   (d) passing said gas/liquid dispersion through pipeline means to the vicinity of said holding source, such pipeline means providing at least two separate branch lines for re-injecting the gas/liquid dispersion into said holding source, said dispersion passing through turbulence promoter means capable of increasing the flow velocity thereof with a change from non- or low turbulent to high turbulent flow conditions prior to the branch point in the pipeline means for each such branch line;

(e) passing the gas/liquid dispersion under said high turbulent flow conditions to at least two eductor means, positioned on each said branch line and being capable of dissipating the pumping energy of the dispersion into said dispersion, thereby forming an enhanced fine bubble dispersion of oxygen in the liquid waste; and (f) re-injecting the enhanced dispersion from said eductor means into said holding source for the liquid waste, whereby enhanced oxygen/water dispersions are conveniently obtained in a convenient, flexible manner.

2. The process of claim 1 in which said turbulence promoters comprises pipeline reducers.

3. The process of claim 1 in which said oxidation process comprises liquid waste biotreatment wherein toxic chemicals soluble in the liquid waste are consumed by living organisms to which said oxygen is supplied for their survival and multiplication.

4. The process of claim 1 in which said oxidation process comprises liquid waste bioremediation wherein toxic chemicals both soluble and insoluble in the liquid waste are consumed by living organisms to which said oxygen is supplied for their survival and multiplication.

5. The process of claim 1 in which said oxygen-containing gas comprises essentially pure oxygen.

6. The process of claim 4 in which said oxygen-containing gas comprises essentially pure oxygen.

7. The process of claim 1 in which said turbulence promoter means are adapted to provide a flow velocity of at least about 7 feet/sec. at least one flow line diameter upstream of each branch point for the passage of a portion of the dispersion to eductor means.

8. The process of claim 7 in which such flow velocity is at least about 10 feet/sec.

9. The process of claim 7 in which said turbulence promoter means comprises pipeline reducers.

10. The process of claim 7 in which said oxidation of liquid waste comprises a bioremediation process.

11. The process of claim 1 and including ingesting unoxygenated water into said eductor means to mix with the oxygen/liquid waste dispersion, with the mixture thereof being re-injected into said holding source for the liquid waste.

12. The process of claim 10 and including ingesting unoxygenated water into said eductor means to mix with the oxygen/liquid waste dispersion, with the mixture thereof being re-injected into said holding source for the liquid waste.

13. The process of claim 1 in which said holding source for liquid waste comprises a lagoon.

14. The process of claim 10 in which said holding source for liquid waste comprises a lagoon.

15. The process of claim 4 in which the pumping power employed is from about 6 W/m$^3$ to less than 25 W/m$^3$ of liquid volume to assure against excess solids suspension in the liquid waste passed from its holding source through said pipeline contactor.

16. The process of claim 15 in which said pumping power is about 12 W/m$^3$.

17. The process of claim 14 in which said oxygen-containing gas comprises essentially pure oxygen.

18. An improved system for the oxidation of liquid waste comprising:

(a) a flow line for passing liquid waste from its holding source;

(b) conduit means for injecting an oxygen-containing gas into the liquid waste in said flow line to form a gas/liquid waste liquid dispersion;

(c) a pipeline contactor zone for the passage of the gas/liquid waste dispersion at elevated pressure for the dissolution of oxygen into the liquid waste;

(d) pumping means for pumping said liquid waste from its holding source and for pumping the gas/liquid waste dispersion through said pipeline contactor zone under non- or low turbulent conditions at said elevated pressure;

(e) turbulence promoter means adapted to increase the flow velocity of the gas/liquid waste dispersion with a smooth change from non- or low turbulent to high turbulent flow conditions;

(f) pipeline means for passing said gas/liquid waste liquid dispersion under said high turbulent flow conditions to the vicinity of said holding source; and (g) eductor means positioned in said pipeline means and comprising at least two eductors capable of dissipating the pumping energy of the dispersion into said dispersion, thereby enhancing the fine bubble dispersion of oxygen in the liquid waste, said eductor means being adapted to re-inject the enhanced dispersion of oxygen in liquid waste into said holding source for the liquid waste; whereby enhanced oxygen/liquid waste dispersions are conveniently obtained in convenient, flexible means subject to minimum erosion effects during oxidation operations carried out therein.

19. The system of claim 18 in which said pipeline means is being adapted to divide the gas/liquid waste dispersion so that separate portions thereof, each containing essentially the same concentrations of undissolved gas, are passed under said high turbulent flow conditions to each eductor unit, said turbulence promoter means comprising separate pipeline turbulence promotor means positioned before each branch point from which a portion of said gas/liquid waste is passed to said eductor means.

20. The system of claim 18 in which said turbulence promoters means comprises pipeline reducer means.

21. The system of claim 19 in which said turbulence promoter means are adapted to provide a flow velocity of at least about 7 feet/sec at least one flow line diameter upstream of each said branch point.

22. The system of claim 21 in which said flow velocity is at least about 10 feet/sec.

23. The system of claim 21 in which said turbulence promoter means comprises pipeline reducer means.

24. The system of claim 18 in which said eductor means includes means for ingesting unoxygenated water for mixing with said gas/liquid waste dispersion and injection into said holding source for said liquid waste.

25. The system of claim 21 in which said eductor means includes means for ingesting unoxygenated water for mixing with said gas/liquid waste dispersion and dispersion into said holding source for such liquid waste.

26. The system of claim 18 in which said holding source comprises a lagoon.

27. The system of claim 25 in which said holding source comprises a lagoon.

28. The system of claim 18 in which said liquid waste comprises water containing toxic chemicals soluble therein and desired to be consumed by living organisms to which said oxygen is supplied for their survival and multiplication.

29. The system of claim 18 in which said liquid waste comprises water containing toxic chemicals both soluble and insoluble in the liquid waste and desired to be consumed by living organisms to which said oxygen is supplied for their survival and multiplication.

30. The system of claim 23 in which said pipeline means comprises increasingly smaller diameter portions, each smaller diameter portions commencing at said pipeline reducer means positioned upstream of each branch point for pipeline means passing gas/liquid waste dispersion to said eductor means.

31. The system of claim 23 in which at least four eductor means are incorporated therein.

32. The system of claim 18 and including control means to prevent liquid flow or pressurization of said flow line unless the gas pressure upstream of valve means in said conduit means for injecting oxygen-containing gas into the liquid waste is higher than the liquid pressure.

33. The system of claim 18 and including supply means for supplying essentially pure oxygen for injection into said liquid waste.

34. The system of claim 21 and including supply means for supplying essentially pure oxygen for injection into said liquid waste.

* * * * *